(12) United States Patent
Caullet et al.

(10) Patent No.: US 7,431,913 B2
(45) Date of Patent: Oct. 7, 2008

(54) EUO-STRUCTURAL-TYPE ZEOLITE THAT CONTAINS THE N,N-DIMETHYL-N,N-DI (3,3-DIMETHYLBUTYL)AMMONIUM CATION AND ITS PROCESS FOR PREPARATION

(75) Inventors: Philippe Caullet, Illzach (FR); Sylvie Lacombe, Saint Genis Laval (FR); Jean-Louis Paillaud, Mulhouse (FR); Nicolas Bats, Feyzin (FR); Loic Rouleau, Charly (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/638,352

(22) Filed: Dec. 14, 2006

(65) Prior Publication Data

US 2007/0117711 A1 May 24, 2007

Related U.S. Application Data

(63) Continuation of application No. PCT/FR2006/001232, filed on May 23, 2006.

(30) Foreign Application Priority Data

Jun. 16, 2005 (FR) .................................. 05 06135

(51) Int. Cl.
*C01B 33/36* (2006.01)
*C01B 39/04* (2006.01)
*C01F 7/00* (2006.01)
*B01J 29/06* (2006.01)
*B01J 21/00* (2006.01)
*B01J 29/00* (2006.01)

(52) U.S. Cl. ....................... 423/703; 423/700; 423/702; 502/64; 502/73; 502/60

(58) Field of Classification Search .................. 502/64, 502/73; 423/706, 708, 709
See application file for complete search history.

(56) References Cited

U.S. PATENT DOCUMENTS 6,514,479 B1 * 2/2003 Merlen et al. ............... 423/705
6,616,910 B2 * 9/2003 Rouleau et al. ............. 423/706

* cited by examiner

*Primary Examiner*—Jerry Lorengo
*Assistant Examiner*—Noah S Wiese
(74) *Attorney, Agent, or Firm*—Millen, White, Zelano & Branigan, P.C.

(57) ABSTRACT

A new EUO-structural-type zeolite that comprises at least one tetravalent element X that is selected from among silicon, tin, titanium and germanium and optionally at least one trivalent element T that is selected from among aluminum, iron, boron, indium and gallium is described. This new zeolite is characterized in that it contains, in its crude synthesis form, the nitrogen-containing organic cation of formula N,N-dimethyl-N,N-di(3,3-dimethylbutyl)ammonium. A method for the preparation of this zeolite is also described.

20 Claims, No Drawings

EUO-STRUCTURAL-TYPE ZEOLITE THAT CONTAINS THE N,N-DIMETHYL-N,N-DI (3,3-DIMETHYLBUTYL)AMMONIUM CATION AND ITS PROCESS FOR PREPARATION

This application is a continuation of International Application PCT/FR06/01232 filed May 23, 2006, which claims benefit of priority from French Application 05/06.135 filed Jun. 16, 2005.

TECHNICAL FIELD

This invention relates to a new EUO-structural-type zeolite that contains, in its intracrystalline pores, at least the nitrogen-containing organic cation of formula N,N-dimethyl-N,N-di(3,3-dimethylbutyl)ammonium. The invention also relates to the process for the preparation of said zeolite and the use of the latter as an element of a catalyst in a process for conversion of hydrocarbon feedstocks, as an element of an adsorbent in a process for separation of hydrocarbon molecules, or in a pollution control process.

PRIOR ART

The EUO-structural-type zeolites are described in the prior art (Ch. Baerlocher, W. M. Meier, and D. H. Olson, "*Atlas of Zeolite Structure Types*," 5th Edition, 2001) and exhibit a monodimensional microporous network with pores delimited by ten tetrahedron rings whose diameter is 4.1×5.4 Å (1 Å=1 angstrom=$1.10^{-10}$ m). These monodimensional channels have side pockets with a depth of 8.1 Å and a diameter of 6.8×5.8 Å (*Zeolites*, 8, 74, 1988).

The EUO-structural-type zeolites comprise the EU-1 zeolite, the TPZ-3 zeolite and the ZSM-50 zeolite and generally have the following formula in anhydrous form: 100 $XO_2$: 0-10 $T_2O_3$: 0-20 $R_{2/n}O$, where R represents a cation with a valence n, X represents the silicon and/or the germanium, and T represents at least one element that is selected from among aluminum, iron, gallium, boron, titanium, vanadium, zirconium, molybdenum, arsenic, antimony, chromium and manganese.

In a general manner, the methods for the preparation of EUO-structural-type zeolites comprise the mixing in aqueous medium of at least one source of an element X, at least one source of an element T, at least one source of an alkaline metal and a nitrogen-containing organic compound that plays the role of a structuring agent.

The methods for the synthesis of EUO-structural-type zeolites differ in particular by the nature of the organic structuring agent that is used, the proportion of nitrogen in the crude synthesis zeolite, and the chemical composition of the crystalline framework.

The EU-1 zeolite, described in the European Patent Application EP-A-0 042 226, is prepared with the sources of elements X and T (X/T preferably between 5 and 75) by using as a structuring agent either the alkylated derivative of an α,ω-diammonium polymethylene, or a product for the degradation of said derivative or else precursors of said derivative, whereby after synthesis, the structuring agent is found in the intracrystalline pores of said zeolite (A. Moini et al., *Zeolites*, 14, 504-511, 1994).

The TPZ-3 zeolite, described in the European Patent Application EP-A-0 051 318, is prepared with the sources of elements X and T (X/T between 10 and 125) by using the same structuring agent family as the one used for synthesizing the EU-1 zeolite. The use of the 1,6-N,N,N,N',N',N'-hexamethylhexamethylene diammonium compound is described in particular.

The ZSM-50 zeolite, described in the documents EP-A-0 159 845 and U.S. Pat. No. 4,640,829, is prepared with the sources of elements X and T (X/T greater than 50) by using as a structuring agent the derivative dibenzyldimethyl ammonium (DBDMA), which is contained in the intracrystalline pores of said zeolite (A. Thangaraj et al., *Zeolites*, 11, 69-72, 1991).

The zeolites are used a great deal in the industry of refining and petrochemistry, as an element of a catalyst in a process for converting hydrocarbon feedstocks and as an adsorbent element for pollution control or separation.

SUMMARY OF THE INVENTION

This invention is based on the discovery of a new EUO-structural-type zeolite that comprises at least one tetravalent element X that is selected from among silicon, tin, titanium and germanium, preferably selected from among silicon and germanium, and optionally at least one trivalent element T that is selected from among aluminum, iron, boron, indium and gallium and characterized in that it contains at least the N,N-dimethyl-N,N-di(3,3-dimethylbutyl)ammonium cation in its intracrystalline pores. Very preferably, the element X is silicon, and the element T is aluminum. Very advantageously, said zeolite, in its crude synthesis form, does not contain, in its intracrystalline pores, cations other than the nitrogen-containing organic cation of the formula N,N-dimethyl-N,N-di (3,3-dimethylbutyl)ammonium. In particular, the EUO-structural-type zeolite according to the invention is preferably lacking an alkaline or alkaline-earth cation. The invention also relates to a process for the preparation of said zeolite and the use of the latter as an element of a catalyst in a process for conversion of hydrocarbon feedstocks, as an element of an adsorbent in a process for the separation of hydrocarbon molecules, or in a pollution control process.

DESCRIPTION OF THE INVENTION

The object of this invention is an EUO-structural-type zeolite that comprises at least one tetravalent element X that is selected from among silicon, tin, titanium and germanium, whereby said zeolite is characterized in that it contains at least the N,N-dimethyl-N,N-di(3,3-dimethlylbutyl)ammonium cation in its intracrystalline pores.

The tetravalent element X that is present in the EUO-structural-type zeolite according to the invention is preferably selected from among silicon and germanium, and even more preferably said element X is silicon.

The EUO-structural-type zeolite according to the invention also comprises, and according to a preferred embodiment of said zeolite, at least one trivalent element T that is selected from among aluminum, iron, boron, gallium and indium. The element T is preferably aluminum.

The structure of the EUO-structural-type zeolite according to the invention is identified by x-ray diffractometry. Its crystallinity is calculated from the diffraction diagram by comparison with a reference EUO-structural-type zeolite. The crystallinity corresponds to the ratio of the surface area of the peaks of the analyzed solids to the surface area of the peaks of the reference EUO-structural-type zeolite, in the range of diffraction angle 2θ=8 to 40°. The zeolite according to this invention has a diffraction diagram according to that of the EUO-structural-type zeolites, and it has a crystallinity of more than 80%, preferably more than 85%, and even more preferably more than 90%.

The chemical composition of the EUO-structural-type zeolite according to the invention is determined by the standard techniques of elementary analyses. In particular, the contents of elements X and optionally of element T, in particular of silicon and optionally of aluminum, are determined by x-ray fluorescence. The X/T ratio, in particular the Si/Al ratio, of the EUO-structural-type zeolite according to the invention is at least equal to 5, preferably at least equal to 15, and very preferably at least equal to 60. In the preferred case where the element X is silicon and the element T is aluminum, the EUO-structural-type zeolite according to the invention is then a crystallized aluminosilicate whose Si/Al ratio is at least equal to 5, preferably at least equal to 15, and very preferably at least equal to 60.

The N,N-dimethyl-N,N-di(3,3-dimethylbutyl)ammonium cation that plays the role of structuring agent and that is present in the intracrystalline pores of the EUO-structural-type zeolite according to the invention is identified by nuclear magnetic resonance spectroscopy of carbon 13 with rotation at the magic angle and crossed polarization. The chemical displacements measured by NMR $^1$H (D$_2$O, 400 MHz, 25° C., δ ppm/TMS) are located at 0.83 (s, 18H), 1.51-1.55 (m, 4H), 2.91 (s, 6H) and 3.18-3.23 (m, 4H). Very preferably, the EUO-structural-type zeolite according to the invention, in its crude synthesis form, does not contain, in its intracrystalline pores, cations other than the nitrogen-containing organic cation of formula N,N-dimethyl-N,N-di(3,3-dimethylbutyl)ammonium. In particular, the EUO-structural-type zeolite according to the invention is preferably lacking an alkaline or alkaline-earth cation.

Another object of the invention is the process for the preparation of the EUO-structural-type zeolite according to the invention. The process for preparation according to the invention comprises the mixing in aqueous medium of at least one source of at least one tetravalent element X that is selected from among silicon, tin, titanium and germanium, optionally at least one source of at least one trivalent element T that is selected from among aluminum, iron, boron, indium and gallium, at least one nitrogen-containing organic structuring agent Z that is selected from among a salt of N,N-dimethyl-N,N-di(3,3-dimethylbutyl)ammonium and the precursors that correspond to said salt. The mixture is heated until the EUO-structural-type zeolite crystallizes.

The nitrogen-containing organic structuring agent Q can be an N,N-dimethyl-N,N-di(3,3-dimethylbutyl)ammonium salt, in particular a halide, a hydroxide, a sulfate, a silicate or an aluminate of N,N-dimethyl-N,N-di(3,3-dimethylbutyl) ammonium. Very preferably, the nitrogen-containing organic structuring agent used in the process according to the invention is the N,N-dimethyl-N,N-di(3,3-dimethylbutyl)ammonium hydroxide.

The N,N-dimethyl-N,N-di(3,3-dimethylbutyl)ammonium salts can also be obtained from precursors that can be used as they are in the reaction mixture or can be preheated together in the reaction container, preferably in solution before the addition of other reagents that are necessary for the synthesis of the EUO-structural-type zeolite. Precursors of an N,N-dimethyl-N,N-di(3,3-dimethylbutyl)ammonium salt are, in particular, N,N,3,3-tetramethylbutylamine and 1-bromo-3,3-dimethylbutane, which are advantageously mixed at a temperature that is close to 100° C.

Zeolitic materials S that play the role of nuclei can be introduced during the process for preparation of the invention, in several forms, to promote and accelerate the formation of the EUO-structural-type zeolite. These nuclei are at least partially, and preferably totally, of the same structural type as the EUO zeolite of the invention. Very advantageously, these are therefore nuclei of at least one EUO-structural-type zeolitic material. These nuclei comprise at least one source of element X and at least one source of element T, with an X/T ratio of between 1 and 1000, where X and T are defined as above. Very preferably, the zeolite of the invention is synthesized by means of zeolitic nuclei that comprise the same elements X and T. These nuclei can be introduced, after having undergone at least one of the stages selected from among the following stages: washing, drying, calcination and ion exchange. The nuclei can also be introduced in the crude synthesis form.

The zeolitic materials that play the role of nuclei can be introduced at any time in the process for the preparation of the EUO-structural-type zeolite that it is desired to synthesize. The nuclei can be introduced at the same time as the source of the element X, optionally that of the element T, and of the organic structuring agent Z, or the nuclei can be introduced first into the aqueous mixture or else the nuclei can be introduced after the introduction of the source of the element X, optionally that of the element T, and of the nitrogen-containing organic structuring agent. The nuclei are preferably introduced after homogenization, at least in part, of the aqueous mixture that contains the source of the element X, optionally that of the element T, and said nitrogen-containing organic structuring agent.

While the size of the particles of zeolitic nuclei can have an influence on the synthesis process, it is advisable to select nuclei that have a particle size such that the synthesis conditions are optimum. Zeolitic nuclei particle is defined either as a zeolite crystal or an aggregate of zeolite crystals where an aggregate is a unit formed by at least two zeolite crystals having at least one contact point between them. Thus, at least the majority, i.e., at least 90% by volume, of the nuclei particles introduced during the preparation of the EUO-structural-type zeolite have a size of between 0.001 and 500 μm, preferably between 0.005 and 250 μm, and even more preferably between 0.005 and 200 μm.

In the process for preparation according to the invention, the reaction mixture has the following composition, expressed in the form of oxides:

| | |
|---|---|
| XO$_2$/T$_2$O$_3$ (mol/mol) | 10-∞ |
| OH$^-$/XO$_2$ (mol/mol) | 0.002 to 5 |
| Q/XO$_2$ (mol/mol) | 0.002 to 5 |
| H$_2$O/XO$_2$ (mol/mol) | 1 to 500 |
| S/XO$_2$ (g/g) | 0 to 0.1 | preferably, the reaction mixture has the following composition, expressed in the form of oxides:

| | |
|---|---|
| XO$_2$/T$_2$O$_3$ (mol/mol) | 30-∞ |
| OH$^-$/XO$_2$ (mol/mol) | 0.005 to 4 |
| Q/XO$_2$ (mol/mol) | 0.005 to 4 |
| H$_2$O/XO$_2$ (mol/mol) | 3 to 250 |
| S/XO$_2$ (g/g) | 0 to 0.07 | and, even more preferably, the reaction mixture has the following composition, expressed in the form of oxides:

| | |
|---|---|
| XO$_2$/T$_2$O$_3$ (mol/mol) | 120-∞ |
| OH$^-$/XO$_2$ (mol/mol) | 0.01 to 3 |

| -continued | |
|---|---|
| Q/XO₂ (mol/mol) | 0.01 to 3 |
| H₂O/XO₂ (mol/mol) | 5 to 100 |
| S/XO₂ (g/g) | 0 to 0.04 | where

X represents at least one tetravalent element that is selected from among silicon, tin, titanium and germanium, preferably selected from among silicon and germanium, and very preferably X is silicon, T represents at least one trivalent element that is selected from among aluminum, iron, boron, indium and gallium, and preferably T is aluminum, Q represents an N,N-dimethyl-N,N-di(3,3-dimethylbutyl) ammonium salt or the precursors that correspond to said salt, S represents the zeolite nuclei that are present in the crude, dried, calcined or exchanged form.

Q is preferably introduced in the form of an N,N-dimethyl-N,N-di(3,3-dimethylbutyl)ammonium salt, and very preferably said salt is introduced in its hydroxide form. This form can be obtained from an N,N-dimethyl-N,N-di(3,3-dimethylbutyl)ammonium halide. The N,N-dimethyl-N,N-di(3,3-dimethylbutyl)ammonium hydroxide is preferably obtained by treatment at ambient temperature of an N,N-dimethyl-N, N-di(3,3-dimethylbutyl)ammonium bromide solution by silver oxide. The N,N-dimethyl-N,N-di(3,3-dimethylbutyl)ammonium bromide can be prepared by methods that are known to one skilled in the art. A possible method for preparation of the N,N-dimethyl-N,N-di(3,3-dimethylbutyl)ammonium bromide is provided by the following reaction diagram:

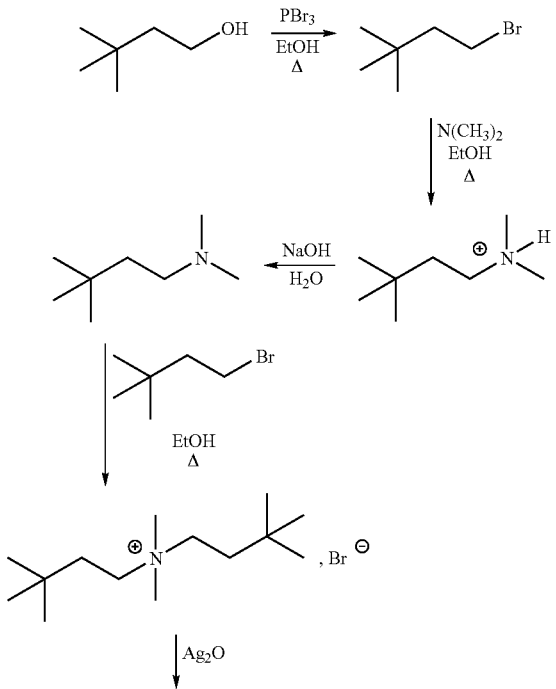

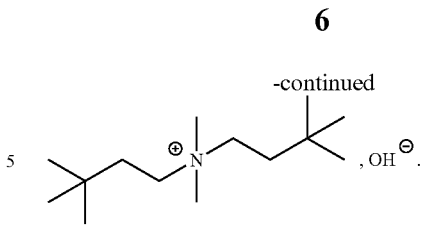

X is preferably silicon, and T is preferably aluminum.

The source of the tetravalent element X can be any compound that comprises the element X and can release this element in solution in reactive form. Advantageously, when the element X is silicon, the silicon source can be any of those whose use is usually considered for the synthesis of zeolites, for example solid silica in powder form, silicic acid, colloidal silica or silica in solution. Among the powder silicas that can be used, it is suitable to cite the precipitated silicas, especially those that are obtained by precipitation from a solution of an alkaline metal silicate, such as the "Zeosil" or the "Tixosil," produced by Rhodia; the pyrogenated silicas, such as the "Aerosil" produced by Degussa; and the "Cabosil" produced by Cabot; and the silica gels. Colloidal silicas of various grain sizes can be used, such as those sold under the "LUDOX" registered trademarks of Dupont. The dissolved silicas that can be used are in particular the soluble glasses or marketed silicates that contain: 0.5 to 6.0 and especially 2.0 to 4.0 mol of $SiO_2$ per mol of alkaline metal oxide and the silicates that are obtained by dissolution of silica in an alkaline metal hydroxide, a quaternary ammonium hydroxide or a mixture of the latter.

The source of the trivalent element T, optionally introduced into the process for preparation according to the invention, can be any compound that comprises the element T and that can release this element into aqueous solution. In the preferred case where T is aluminum, the aluminum source is most advantageously aluminum hydroxide but can also be aluminum, an aluminum salt, for example chloride, nitrate or sulfate, an aluminum alcoholate or the alumina itself, which preferably is found in a hydrated or hydratable form such as colloidal alumina, pseudoboehmite, boehmite, gamma-alumina, or aluminum trihydrates.

It is possible to use mixtures of the sources cited above. Combined sources of silicon and aluminum, such as the amorphous silica-aluminas or certain clays, can also be used.

The reaction mixture is usually caused to react under the autogenous pressure, optionally with supply of a gas, for example nitrogen, at a temperature of between 85 and 250° C. until crystals of the zeolite are formed, crystals which can last for 1 minute to several months according to the composition of the reagents, the method of heating and mixing, the working temperature and the stirring. Stirring is optional, but preferable, in particular because it shortens the duration of the reaction.

In terms of the reaction, the solid phase is collected on a filter and washed. In this stage, the EUO zeolite that is obtained according to the process of the invention is said to be raw straight from synthesis and in its intracrystalline pores contains at least the N,N-dimethyl-N,N-di(3,3-dimethylbutyl)ammonium cation. The zeolite is then ready to be dried and/or calcined. Thus, in order to obtain the protonated hydrogen form of the EUO-structural-type zeolite, a calcination stage of said crude synthesis zeolite is generally initiated at a temperature of between 500 and 600° C. After calcination, the nitrogen-containing organic structuring agent is removed from the EUO-structural-type zeolite according to the invention. The zeolite of the invention no longer contains nitrogen when it is in its calcined form.

This invention also relates to the use of the EUO-structural-type zeolite as an acidic solid for catalysis in the fields of refining and petrochemistry. Acidic solid is defined as the zeolite being in hydrogen form, i.e., the crude synthesis zeolite has been calcined. The EUO-structural-type zeolite of the invention is also advantageously used as adsorbent for monitoring pollution or as a molecular sieve for separation.

For example, when the EUO-structural-type zeolite is used as an acidic solid in a catalyst, it is in calcined form, i.e., nitrogen-containing structuring agent is removed therefrom, and it can be combined with an inorganic matrix that can be inert or catalytically active or optionally with a metallic phase. The inorganic matrix can be present simply as a binder to keep together the small particles of the zeolite under the various known forms of catalysts (extrudates, pellets, balls, powders) or else can be added as a diluent for imposing the degree of conversion into a process that would otherwise proceed at too quick a rate, leading to fouling of the catalyst due to excessive coke formation. Typical inorganic matrices are in particular substrate materials for the catalysts, such as different forms of silica, alumina, silica-aluminas, magnesia, zirconia, titanium and boron oxides, aluminum, titanium and zirconium phosphates, clays such as kaolin, bentonite, montmorillonite, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$Beo$, $SiO_2$—$TiO_2$, or any combination of these compounds.

The EUO-structural-type zeolite of the invention can also be combined with at least one other zeolite and can play the role of primary active phase or additive.

The inorganic matrix can be a mixture of different compounds, in particular an inert phase and an active phase.

The metallic phase is introduced into the zeolite alone, the inorganic matrix alone or the inorganic matrix-zeolite unit, for example by impregnation with cations or oxides that are selected from among the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element of the periodic table.

The catalytic compositions that comprise an EUO-structural-type zeolite, obtained from the calcination of the EUO-structural-type zeolite according to the invention, are suitable in general for the use of the primary processes for transformation of hydrocarbons and reactions for synthesis of organic compounds such as ethers.

The catalytic compositions that comprise an EUO-structural-type zeolite, obtained from the calcination of the EUO-structural-type zeolite according to the invention, advantageously find their application in the reactions of isomerization, transalkylation and dismutation, alkylation and dealkylation, hydration and dehydration, oligomerization and polymerization, cyclization, aromatization, cracking and hydrocracking, reforming, hydrogenation and dehydrogenation, oxidation, halogenation, amine syntheses, hydrodesulfurization and hydrodenitrification, and catalytic elimination of nitrogen oxides, whereby said reactions comprise saturated and unsaturated aliphatic hydrocarbons, aromatic hydrocarbons, oxygenated organic compounds and organic compounds containing nitrogen and/or sulfur, as well as organic compounds that contain other functional groups.

The invention is illustrated by the following examples.

EXAMPLE 1

Synthesis of the Nitrogen-Containing Organic Structuring Agent, N,N-Dimethyl-N,N-di(3,3-dimethylbutyl)ammonium Hydroxide A mixture that contains 1 g ($0.77.10^{-2}$ mol) of N,N,3,3-tetramethylbutylamine (Aldrich) and 1.917 g ($1.16.10^{-2}$ mol) of 1-bromo-3,3-dimethylbutane (Prolabo) and about 4 ml of isopropanol is prepared. 1.23 g ($1.16.10^{-2}$ mol) of sodium carbonate is then added. This suspension is brought to reflux for 2 days at the temperature of 100° C. A white solid appears, and after this period, about 5 ml of diethyl ether is added to the reaction mixture so as to increase the amount of precipitate. The isopropanol and the diethyl ether are then evaporated at 30° C. by means of a rotary evaporator. The organic product that is formed is extracted from the reaction mixture by means of dichloromethane. Three successive extractions with 10 ml of dichloromethane are carried out. The organic phase that is obtained is evaporated by means of a rotary evaporator. The white solid that is formed is washed with dry diethyl ether and filtered on a nylon membrane (Ø=0.2 μm). 0.8 g ($0.27.10^{-2}$ mol) of N,N-dimethyl-N,N-di(3,3-dimethylbutyl)ammonium bromide (DMDMBA-Br) is then obtained. The nature of the radical that is obtained was verified by nuclear magnetic resonance of the proton; the results of this analysis are provided below. NMR $^1H$ ($D_2O$, 400 MHz, 25° C., δ ppm /TMS): 0.83 (s, 18H), 1.51-1.55 (m, 4H), 2.91 (s, 6H), 3.18-3.23 (m, 4H).

Excess silver oxide ($Ag_2O$) is brought into contact with an aqueous solution of DMDMBA-Br (1.5 $Ag_2O$ for 1 DMDMBA-Br). This mixture is stirred continuously for one night at ambient temperature. The silver bromide that is formed is then separated from the solution by centrifuging. The supernatant liquid is an N,N-dimethyl-N,N-di(3,3-dimethylbutyl)ammonium hydroxide solution. The concentration of this solution is determined by nuclear magnetic resonance of the proton.

EXAMPLE 2

For Comparison

EUO-structural-type zeolite that contains the elements Si and Al, with an Si/Al ratio that is equal to 25.0, synthesized with the hexamethylammonium cation as an organic structuring agent.

The EUO-structural-type zeolite that contains the elements Si and Al, with an Si/Al ratio that is equal to 25.0, is synthesized with the hexamethonium bromide (HM, 1,6-bis(trimethylammonium)hexane) according to the conditions that are described by J. L. Casci el al. in Example 3 of the Patent EP-A-0 042 226.

The results of the x-ray diffraction and the chemical analysis are recorded in Table 1. The solid that is obtained is a pure EUO zeolite with reference crystallinity (100%) and an Si/Al ratio of 25.0.

TABLE 1

Characteristics of the Solid that is Obtained

X-Ray Diffraction

| | |
|---|---|
| Phase Identification | EUO |
| Crystallinity (%) | 100 (Reference) |

TABLE 1-continued

Characteristics of the Solid that is Obtained

X-Ray Diffraction
Chemical Analyses

| | |
|---|---|
| SiO$_2$ (% by Weight) | 81.0 |
| Al$_2$O$_3$ (% by Weight) | 2.75 |
| Na$_2$O (% by Weight) | 0.47 |
| N (% by Weight) | 1.40 |
| PAF (% by Weight) | 15.0 |
| Si/Al (mol/mol) | 25.0 |

PAF = Loss due to fire

This zeolite, containing the elements Si and Al, with an Si/Al ratio of 25.0 and prepared with HM according to the prior art, corresponds to the EU-1 zeolite. It is used as nuclei for the synthesis of the EUO-structural-type zeolite according to the invention.

EXAMPLE 3

(Invention): Purely Silicic EUO-Structural-Type Zeolite Synthesized in the Presence of Nuclei The synthesis conditions are defined in Table 2.

The solution A that consists of water and nitrogen-containing organic structuring agent is prepared by diluting 2.62 g of an aqueous solution with 20.6% by mass of N,N-dimethyl-N,N-di(3,3-dimethylbutyl)ammonium hydroxide in 0.92 g of water. 0.3 g of silica (Aerosil 130, Degussa) is added to this solution. The mixture is stirred for 1 hour until homogenization is completed. Then, 6 mg of EUO-structural-type zeolite nuclei, raw straight from synthesis and containing the elements Si, Al, sodium and hexamethonium cation, prepared according to Example 2, is added. The reaction gel is mixed for 30 minutes, and then the resulting mixture is reacted in a 20 ml autoclave while being stirred for 2 days at 170° C. under autogenous pressure. After cooling, the product is filtered, and it is washed with 250 ml of demineralized water, then it is dried in a ventilated oven at 120° C.

TABLE 2

Synthesis Conditions

Formulation of Gel

| | |
|---|---|
| SiO$_2$ (mol) | 60 |
| QOH (mol) | 28 |
| H$_2$O (mol) | 2000 |
| EUO/SiO$_2$ (g/g) | 0.02 |

Crystallization Conditions

| | |
|---|---|
| Temperature (° C.) | 170 |
| Stirring | Turning Bar, 25 rpm |
| Crystallization Period (Day) | 2 |

The results of x-ray diffraction and nuclear magnetic resonance spectroscopy of carbon 13 by rotation at the magic angle under crossed polarization are recorded in Table 3. This synthesis leads to a pure EUO-structural-type zeolite with a crystallinity of 95% relative to the reference (zeolite obtained in Example 2), containing the N,N-dimethyl-N,N-di(3,3-dimethylbutyl)ammonium cation in its intracrystalline pores.

TABLE 3

Characteristics of the Solid that is Obtained

X-Ray Diffraction

| | |
|---|---|
| Phase Identification | EUO |
| Crystallinity (%) | 95 |

Nuclear Magnetic Resonance Spectroscopy
of Carbon 13 at the Magic Angle
Under Crossed Polarization

| | |
|---|---|
| Identification of the Organic Compound Included in the Zeolite | N,N-Dimethyl-N,N-di(3,3-dimethylbutyl)ammonium |

This EUO-structural-type crude synthesis zeolite, purely silicic and containing the N,N-dimethyl-N,N-di(3,3-dimethylbutyl)ammonium cation, illustrates this invention.

EXAMPLE 4

(Invention): Purely Silicic EUO-Structural-Type Zeolite Prepared in the Absence of Nuclei The synthesis conditions are defined in Table 4.

The solution A that consists of water and the nitrogen-containing organic structuring agent is prepared by diluting 2.62 g of an aqueous solution with 20.6% by mass of N,N-dimethyl-N,N-di(3,3-dimethylbutyl)ammonium hydroxide in 0.92 g of water. 0.3 g of silica (Aerosil 130, Degussa) is added to this solution. The mixture is stirred for 1 hour until homogenization is completed. The resulting mixture is then reacted in a 20 ml autoclave while being stirred for 21 days at 170° C. under autogenous pressure. After cooling, the product is filtered and it is washed with 250 ml of demineralized water, then it is dried in a ventilated oven at 120° C.

TABLE 4

Synthesis Conditions

Formulation of the Gel

| | |
|---|---|
| SiO$_2$ (mol) | 60 |
| QOH (mol) | 28 |
| H$_2$O (mol) | 2000 |

Crystallization Conditions

| | |
|---|---|
| Temperature (° C.) | 170 |
| Stirring | Turning Bar, 25 rpm |
| Crystallization Period (Day) | 21 |

The results of x-ray diffraction and nuclear magnetic resonance spectroscopy of carbon 13 by rotation at the magic angle under crossed polarization are recorded in Table 5. This synthesis leads to the pure EUO-structural-type zeolite with a crystallinity of 90% relative to the reference (zeolite obtained in Example 2), purely silicic and containing the N,N-dimethyl-N,N-di(3,3-dimethylbutyl)ammonium cation in its intracrystalline pores.

TABLE 5

Characteristics of the Solid that is Obtained

X-Ray Diffraction

| | |
|---|---|
| Phase Identification | EUO |
| Crystallinity (%) | 90 |

Nuclear Magnetic Resonance Spectroscopy
of Carbon 13 at the Magic Angle
under Crossed Polarization

| | |
|---|---|
| Identification of the Organic Compound Included in the Zeolite | N,N-Dimethyl-N,N-di(3,3-dimethylbutyl)ammonium |

This EUO-structural-type crude synthesis zeolite, purely silicic and containing the N,N-dimethyl-N,N-di(3,3-dimethylbutyl)ammonium cation in its intracrystalline pores, illustrates this invention.

EXAMPLE 5

(Invention): Alumino-Silicic EUO-Structural-Type Zeolite that is Prepared in the Presence of Nuclei The synthesis conditions are defined in Table 6.

The solution A that consists of water and nitrogen-containing organic structuring agent is prepared by diluting 2.47 g of an aqueous solution with 21.82% by mass of N,N-dimethyl-N,N-di(3,3-dimethylbutyl)ammonium hydroxide in 1.07 g of water. 0.0064 g of aluminum hydroxide (Prolabo) is added, and it is stirred for 30 minutes. 0.3 g of silica (Aerosil 130, Degussa) is added to this mixture. The mass is stirred for 1 hour until homogenization is completed. Finally, 6 mg of EUO-structural-type zeolite nuclei, raw straight from synthesis and containing the elements Si, Al, sodium and hexamethonium cation, prepared according to Example 2, is added. The reaction gel is mixed for 30 minutes, then the resulting mixture is reacted in a 20 ml autoclave while being stirred for 4.5 days at 170° C. under autogenous pressure. After cooling, the product is filtered and it is washed with 250 ml of demineralized water, then it is dried in a ventilated oven at 120° C.

TABLE 6

| Synthesis Conditions | |
|---|---|
| Formulation of the Gel | |
| $SiO_2$ (mol) | 60 |
| $Al_2O_3$ (mol) | 0.5 |
| QOH (mol) | 28 |
| $H_2O$ (mol) | 2000 |
| $EUO/SiO_2$ (g/g) | 0.02 |
| Crystallization Conditions | |
| Temperature (° C.) | 170 |
| Stirring | Turning Bar, 25 rpm |
| Crystallization Period (Day) | 4.5 |

The results of x-ray diffraction, chemical analysis and nuclear magnetic resonance spectroscopy of carbon 13 by rotation at the magic angle under crossed polarization are recorded in Table 7. This synthesis leads to the pure EUO-structural-type zeolite with a crystallinity of 90% relative to the reference (zeolite obtained in Example 2), an Si/Al ratio of 100 and containing the N,N-dimethyl-N,N-di(3,3-dimethylbutyl)ammonium cation in its intracrystalline pores.

TABLE 7

| Characteristics of the Solid that is Obtained | |
|---|---|
| X-Ray Diffraction | |
| Phase Identification | EUO |
| Crystallinity (%) | 90 |
| Chemical Analyses | |
| Si/Al (mol/mol) | 100 |
| Nuclear Magnetic Resonance Spectroscopy of Carbon 13 at the Magic Angle Under Crossed Polarization | |
| Identification of the Organic Compound Included in the Zeolite | N,N-Dimethyl-N,N-di(3,3-dimethylbutyl)ammonium |

This EUO-structural-type crude synthesis zeolite, containing the elements Si and Al and the N,N-dimethyl-N,N-di(3,3-dimethylbutyl)ammonium cation and having an Si/Al ratio of 100, illustrates this invention.

EXAMPLE 6

(Invention): Preparation of a Catalyst from an EUO-Structural-Type

Zeolite Synthesized in the Si—Al System, with the N,N-Dimethyl-N,N-di(3,3-dimethylbutyl)ammonium as a Nitrogen-Containing Organic Structuring Agent The zeolite that is used in this example is the EUO-structural-type crude synthesis zeolite that is obtained in the Si—Al system of Example 5 comprising the N,N-dimethyl-N,N-di(3,3-dimethylbutyl)ammonium in its intracrystalline pores and having an overall Si/Al atomic ratio that is equal to 100.

This EUO-structural-type zeolite first undergoes a so-called dry calcination at 550° C. under a flow of air for 8 hours. The solid that is obtained is then put in extrudate form by mixing with boehmite (Pural SB3, Sasol) in a Z-arm mixing machine and by extrusion of the paste that is obtained with a piston extruder. The extrudates are then dried at 120° C. for 12 hours in air and calcined at 550° C. for 2 hours under a flow of air in a muffle furnace. They constitute the substrate of the catalyst.

Platinum is deposited on the alumina of this substrate by anion exchange with hexachloroplatinic acid in the presence of a competing agent (hydrochloric acid). The exchanged substrate is then dried at 120° C. for 12 hours in air and calcined at 550° C. under a stream of dry air for 1 hour.

The thus prepared catalyst consists of contents by weight of 50% of EUO-structural-type zeolite in hydrogen form, 49.8% alumina and 0.2% platinum.

The invention claimed is:

1. An EUO-structural-type zeolite that comprises at least one tetravalent element X that is selected from among silicon, germanium, titanium and tin and characterized in that it contains at least the N,N-dimethyl-N,N-di(3,3-dimethylbutyl) ammonium cation in its intracrystalline pores.

2. A zeolite according to claim 1, wherein the tetravalent element X is selected from among germanium and silicon.

3. A zeolite according to claim 2, wherein the tetravalent element X is silicon.

4. A zeolite according to claim 1 that comprises at least one trivalent element T that is selected from among aluminum, iron, boron, gallium and indium.

5. A zeolite according to claim 4, wherein said element T is aluminum.

6. A zeolite according to claim 4 such that it has an X/T ratio of at least 60.

7. A process for the preparation of an EUO-structural-type zeolite according to claim 1 comprising the mixing in aqueous medium of at least one source of at least one tetravalent element X that is selected from among silicon, tin, titanium and germanium, optionally at least one source of at least one trivalent element T that is selected from among aluminum, iron, boron, indium and gallium, at least one nitrogen-containing organic structuring agent Q that is selected from among an N,N-dimethyl-N,N-di(3,3-dimethylbutyl)ammonium salt, and the precursors corresponding to said salt, said aqueous medium being essentially free of alkali and alkaline earth metals.

8. A process according to claim 7, wherein it is produced in the presence of nuclei (S) of at least one EUO-structural-type zeolitic material.

9. A process according to claim 7, wherein the nuclei are introduced after homogenization, at least in part, of the aqueous mixture that contains the source of the element X, optionally that of the element T, and said nitrogen-containing organic structuring agent.

10. A process according to claim 1, wherein the reaction mixture during the synthesis has the following composition, expressed in the form of oxides:

| | |
|---|---|
| $XO_2/T_2O_3$ (mol/mol) | $10-\infty$ |
| $OH^-/XO_2$ (mol/mol) | 0.002 to 5 |
| $Q/XO_2$ (mol/mol) | 0.002 to 5 |
| $H_2O/XO_2$ (mol/mol) | 1 to 500 |
| $S/XO_2$ (g/g) | 0 to 0.1 |

11. A process according to claim 1, wherein the element X is silicon, and the element T is aluminum.

12. A process according to claim 1, wherein said nitrogen-containing organic structuring agent is the N,N-dimethyl-N,N-di(3,3-dimethylbutyl)ammonium hydroxide.

13. A process according to claim 7, wherein a final calcination stage is carried out.

14. An EUO-structural type zeolite according to claim 1, being essentially free of alkali and alkaline earth metals.

15. An EUO-structural type zeolite according to claim 2, being essentially free of alkali and alkaline earth metals.

16. An EUO-structural type zeolite according to claim 3, being essentially free of alkali and alkaline earth metals.

17. An EUO-structural type zeolite according to claim 4, being essentially free of alkali and alkaline earth metals.

18. An EUO-structural type zeolite according to claim 5, being essentially free of alkali and alkaline earth metals.

19. An EUO-structural type zeolite according to claim 1, being free of alkali and alkaline earth metals.

20. A process for the preparation of an EUO-structural-type zeolite according to claim 19, comprising the mixing in aqueous medium of at least one source of at least one tetravalent element X that is selected from among silicon, tin, titanium and germanium, optionally at least one source of at least one trivalent element T that is selected from among aluminum, iron, boron, indium and gallium, at least one nitrogen-containing organic structuring agent Q that is selected from among an N,N-dimethyl-N,N-di(3,3-dimethylbutyl)ammonium salt, and the precursors corresponding to said salt said aqueous medium being free of alkali and alkaline earth metals.

* * * * *